United States Patent
Kalisz et al.

(10) Patent No.: US 8,702,120 B2
(45) Date of Patent: Apr. 22, 2014

(54) ACTIVE BOLSTER DEPLOYED FROM VEHICLE SEAT

(75) Inventors: Raymond E. Kalisz, Livonia, MI (US); Johnathan A. Line, Northville, MI (US); Michael J. Whitens, Novi, MI (US); Dana M. Niemiec, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/534,417

(22) Filed: Jun. 27, 2012

(65) Prior Publication Data

US 2014/0001799 A1 Jan. 2, 2014

(51) Int. Cl.
*B60R 21/207* (2006.01)
*B60N 2/42* (2006.01)

(52) U.S. Cl.
USPC ............ 280/730.1; 280/728.2; 280/743.1; 280/753; 180/282; 180/271; 297/216.1

(58) Field of Classification Search
USPC ............ 180/282, 271; 280/735, 728.1, 728.2, 280/728.3, 730.1, 730.2, 743.1, 753; 297/216.1, 216.13
See application file for complete search history.

(56) References Cited

U.S. PATENT DOCUMENTS

| | | | |
|---|---|---|---|
| 4,592,588 A * | 6/1986 | Isono et al. | 297/284.6 |
| 4,722,550 A * | 2/1988 | Imaoka et al. | 280/727 |
| 5,464,246 A | 11/1995 | Castro et al. | |
| 5,556,129 A | 9/1996 | Coman et al. | |
| 5,618,595 A * | 4/1997 | Matsushima et al. | 428/35.2 |
| 5,630,616 A | 5/1997 | McPherson | |
| 5,738,368 A | 4/1998 | Hammond et al. | |
| 5,913,536 A | 6/1999 | Brown | |
| 6,029,993 A | 2/2000 | Mueller | |
| 6,037,731 A * | 3/2000 | Fruehauf et al. | 318/468 |
| 6,045,151 A * | 4/2000 | Wu | 280/728.3 |
| 6,203,105 B1 * | 3/2001 | Rhodes, Jr. | 297/284.6 |
| 6,523,237 B1 * | 2/2003 | Kopec et al. | 29/91.1 |
| 6,578,916 B2 * | 6/2003 | Longhi et al. | 297/284.3 |
| 6,629,715 B2 * | 10/2003 | Oh et al. | 296/63 |
| 6,873,892 B2 * | 3/2005 | Katz et al. | 701/49 |
| 6,896,325 B2 * | 5/2005 | Takedomi et al. | 297/216.1 |
| 7,032,926 B2 | 4/2006 | Ruel | |
| 7,264,271 B2 * | 9/2007 | Barvosa-Carter et al. | 280/751 |
| 7,328,945 B2 | 2/2008 | Yoshikawa | |
| 7,441,837 B2 | 10/2008 | Fischer et al. | |
| 7,669,889 B1 | 3/2010 | Gorman et al. | |
| 7,681,907 B2 | 3/2010 | Svenbrant et al. | |

(Continued)

FOREIGN PATENT DOCUMENTS

JP 2011156907 8/2011
WO WO0050270 8/2000

*Primary Examiner* — Faye M Fleming
*Assistant Examiner* — Darlene P Condra
(74) *Attorney, Agent, or Firm* — Vichit Chea; MacMillan, Sobanski & Todd, LLC

(57) ABSTRACT

An active bolster is integrated within a seat for a transportation vehicle by covering an inner inflatable bladder with an outer cushion layer to provide a seating support surface. Seating loads are borne on the support surface from the weight of an occupant by elastic deformation of the bladder. When a vehicle crash event is detected, at least a portion of the bladder is inflated to extend a seat surface to protect the occupant. Size and weight of the seat are reduced as a result of the bladder contributing significantly to the normal cushioning of the seat in everyday usage.

21 Claims, 5 Drawing Sheets

(56) References Cited

U.S. PATENT DOCUMENTS

| | | |
|---|---|---|
| 7,731,226 B2 | 6/2010 | Zink |
| 2004/0163872 A1 | 8/2004 | Lincoln et al. |
| 2004/0222680 A1 | 11/2004 | Freisler et al. |
| 2005/0067209 A1 | 3/2005 | Yoshikawa et al. |
| 2006/0267325 A1 | 11/2006 | Kumagai et al. |
| 2007/0132214 A1* | 6/2007 | Suzuki et al. .............. 280/730.1 |
| 2007/0205587 A1* | 9/2007 | Yoshikawa et al. ......... 280/730.1 |
| 2008/0284143 A1* | 11/2008 | Smith et al. ................ 280/730.2 |
| 2008/0296941 A1* | 12/2008 | Bederka et al. ............ 297/216.1 |
| 2009/0273166 A1 | 11/2009 | Dufau et al. |
| 2009/0289479 A1* | 11/2009 | Kumagai .................... 297/216.1 |
| 2009/0315373 A1* | 12/2009 | Thomas et al. .......... 297/216.13 |
| 2010/0156071 A1 | 6/2010 | Taguchi et al. |
| 2010/0231016 A1* | 9/2010 | Volz .......................... 297/217.1 |
| 2011/0133435 A1 | 6/2011 | Sadr et al. |

* cited by examiner

000
ACTIVE BOLSTER DEPLOYED FROM VEHICLE SEAT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant protection in automotive vehicles, and, more specifically, to bolsters that deploy from within a driver/passenger seat to restrain and protect an occupant during a crash event.

Passenger safety is a paramount concern associated with transportation vehicles such as motor vehicles. Manufacturers aim to continuously improve occupant protection during various types of crash events. Restraining devices such as seat belts and active devices such as airbags and active bolsters are commonly used.

Side impact events (i.e., collisions in which a lateral side of the vehicle is struck) can be particularly challenging since there is less vehicle structure at the sides to protect the occupants. Side airbags such as curtain airbags are increasingly being used for side impact protection.

Regardless of the type of impact, certain types of protective measures become most effective when deployed in close proximity to the occupant. Conventional airbags provide cushioning but are only effective after the occupant has begun moving out from a normal seating position. Airbag and/or active bolster expansion into close proximity to an occupant in order to surround them in their seat would provide the advantages of keep the occupant within the seat during a crash and providing a barrier around the occupant's body. However, it has been found to be difficult to package airbags or bolsters within a seat or at a close proximity to the seat without incurring significant size, weight, and/or cost problems.

SUMMARY OF THE INVENTION

In one aspect of the invention, an integrated seat and active bolster is provided in an automotive vehicle to protect an occupant of the seat during a crash event. An inflatable bladder interfaces with a substantially rigid seat frame. The bladder comprises a gas chamber and has a standby state and a deployed state. An outer cushion layer overlies the inflatable bladder and provides an outer contour along a seat support surface. An inflator is responsive to the occurrence of the crash event to discharge an inflation gas into the gas chamber to expand the inflatable bladder from the standby state to the deployed state. The gas chamber is disposed between the seat frame and the outer cushion layer, and the gas chamber is configured to be load-bearing when in the standby state so that the inflatable bladder elastically deforms to support a load applied against the outer cushion layer. The seat frame provides a reaction surface when the inflatable bladder expands from the standby state to the deployed state. The deployed state extends the seat support surface to increase coverage of the occupant.

In another aspect of the invention, an active bolster method comprises forming a seat having an inner inflatable bladder covered by an outer cushion layer to provide a support surface. Seating loads are borne on the support surface from the weight of an occupant by elastic deformation of the bladder. A vehicle crash event is detected. The bladder is inflated to extend a seat surface to protect the occupant during the crash event.

DETAILED DESCRIPTION OF PREFERRED EMBODIMENTS

Figure 1:
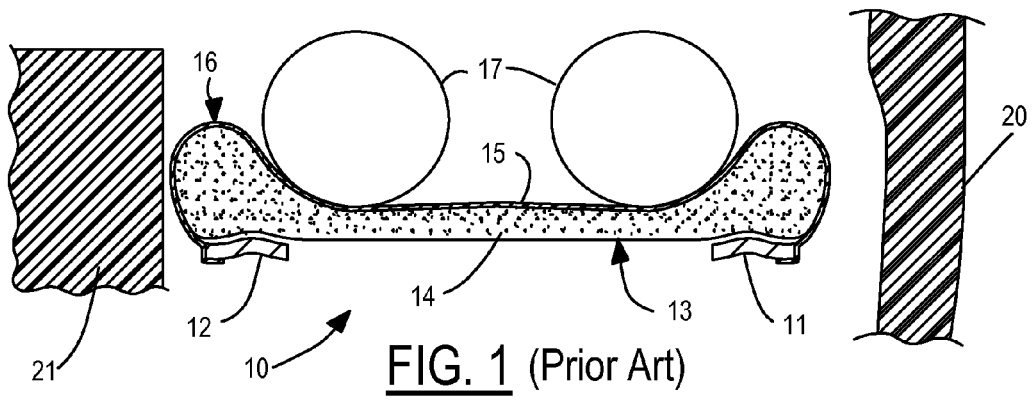
FIG. 1 is a cross-sectional diagram of a conventional passenger seat and occupant in a vehicle prior to a crash event.

Referring now to FIG. 1, a passenger seat 10 without active crash protection includes a frame with seat rails 11 and 12 supporting a seat bottom 13 comprising a conventional foam body 14 and external skin 15. Seat 10 may have various other frame and structural support components as known in the art. Foam 14 and skin 15 provide an outer contour 16 to provide a seating support surface upon which an occupant is seated as shown by an occupant's legs 17. Seat 10 is located in a passenger cabin of a transportation vehicle that includes a door 20 and a center console 21 to the lateral sides of the occupant.

Figure 2:
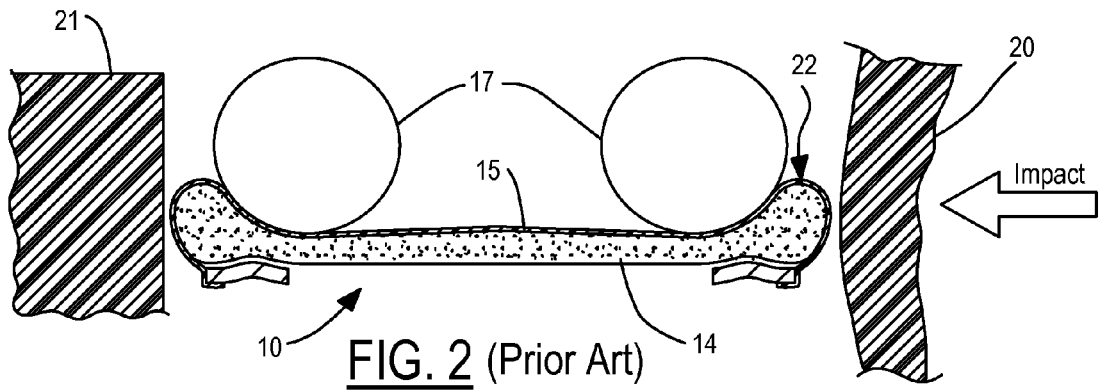
FIG. 2 is a cross-sectional diagram of the conventional passenger seat and occupant of FIG. 1 during a crash event.

During a side impact crash as shown in FIG. 2, an occupant may be accelerated laterally within the passenger compartment. Soft foam 14 deflects as shown at 22 resulting in the occupant not being retained within seat 10, and potentially impacting objects such as door 20 or console 21.

Figure 3:
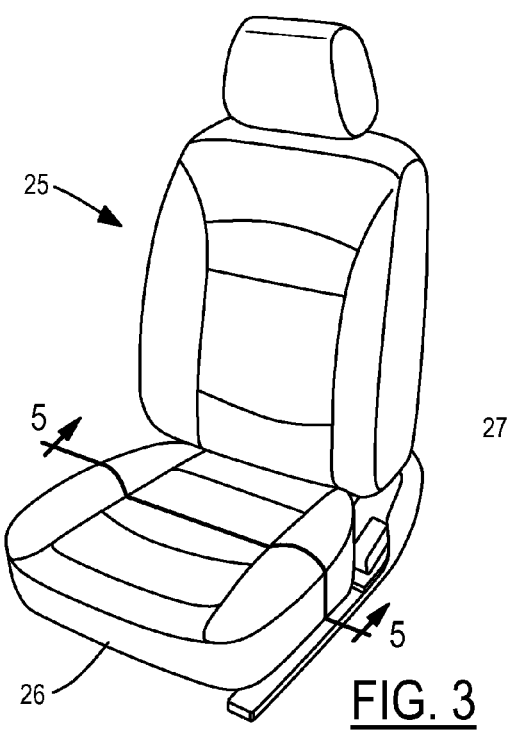
FIGS. 3 and 4 are perspective views of an integrated seat and active bolster in a standby state and a deployed state, respectively.
Figure 4:
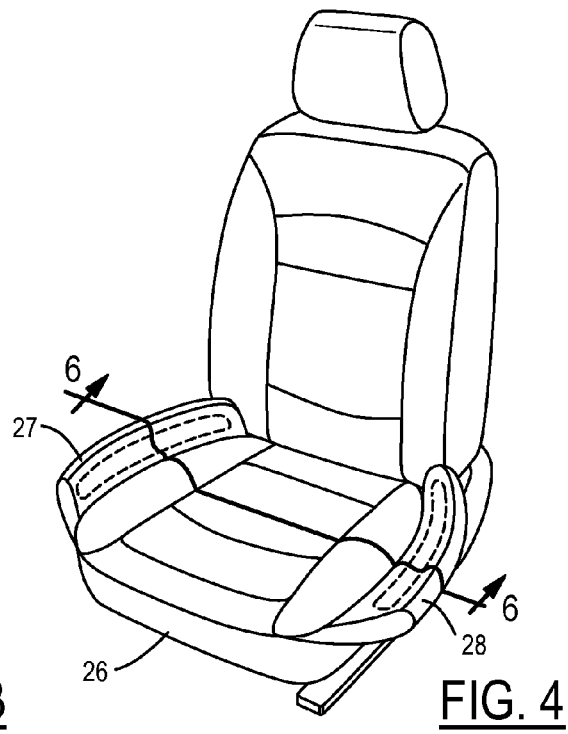

FIGS. 3 and 4 shows an improved seat 25 of the present invention. A seat bottom 26 has a normal seating contour as shown in FIG. 3 during everyday (i.e., pre-crash) usage. When a crash event occurs as sensed by conventional passenger restraint systems (e.g., employing acceleration sensors), one or more bolster sections 27 and/or 28 are deployed from seat 26 so that they extend in a manner that enhances retention of the occupant in the seat and/or establishes a barrier around the occupant to reduce impacts between the occupant and other objects in the vehicle passenger compartment.

Figure 5:
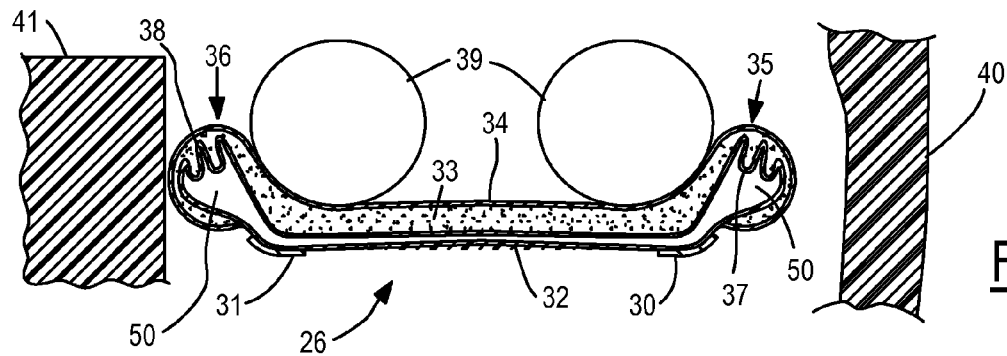
FIG. 5 is a cross section of the integrated seat and active bolster taken along line 5-5 of FIG. 3.

FIG. 5 shows a cross section through seat bottom 26 while it is in the standby state of the present invention. A substantially rigid seat frame includes side rails 30 and 31 supporting an inflatable bladder 32. Seat frame 30-31 may be integrally molded with inflatable bladder portion 32 or may be a separate component. Inflatable bladder 32 includes a gas chamber 50 surrounded by the substantially continuous outer walls of bladder 32. An outer cushion layer overlies bladder 32 and may preferably comprise a seat foam body 33 covered by a flexible skin 34. Seat bottom 26 has a desired outer contour along the seat support surface for receiving the occupants legs 39 between opposite lateral sides 35 and 36 of seat bottom 26. Bladder 32 includes pleated sections 37 and 38 located at lateral sides 35 and 36, respectively. Foam body 33 contains significantly less foam than conventional foam body 14 in FIGS. 1 and 2. The reduction in foam is possible because the present invention employs inflatable bladder 32 to provide a portion of the cushioning support of seat bottom 26 while in its standby state (i.e., before being deployed/inflated during a crash event). Bladder 32 is pressurized or pressurizable and is made of a flexible, molded thermoplastic providing an appropriate amount of elastic deformation in response to seat loads created by an occupant being present in seat bottom 26. More particularly, chamber 50 has a size, shape, and placement within seat bottom 26 to cooperate with foam body 33 so that the total load-bearing properties in the standby state prior to inflation of bladder 32 during a crash event satisfy a desired criteria identified for the particular application.

Figure 6:
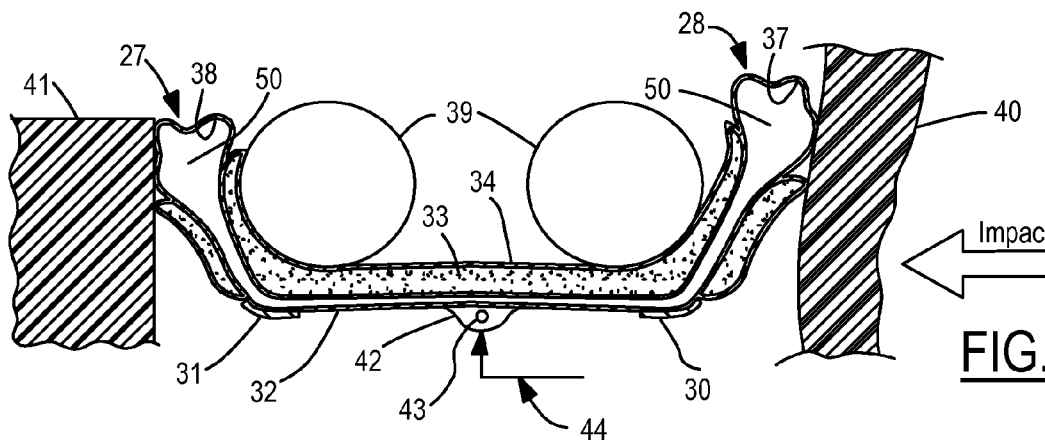
FIG. 6 is a cross section of the integrated seat and active bolster taken along line 6-6 of FIG. 4.

FIG. 6 illustrates the invention during a crash event. Such crash event may be detected in a conventional manner. Inflatable bladder 32 includes a recess 42 for receiving an inflator 43 which may be triggered by a signal received over a signal line 44 from a crash detection module (not shown). Upon triggering, inflator 43 discharges an inflation gas into chamber 50 of inflatable bladder 32 to expand bladder 32 into a deployed state, whereupon pleated sections 37 and 38 expand to provide side bolsters 27 and 28. Seat frame 30/31 provides a reaction surface against which bladder 32 may expand. In particular, the expansion may result in bolster sections 27 and 28 rupturing foam 33 along lateral sides 35 and 36.

In the deployed state, sections 37 and 38 of bladder 32 may expand against door 40 or center console 41 (especially if they are displaced toward seat 26). Thus, door 40 and console 41 may also act as reaction surfaces expansion of bladder 32 to more closely provide a protective barrier around the occupant. In any case, lateral sides 35 and 36 extend the seat support surface alongside the occupant upward in FIG. 6 to increase coverage (e.g., by enveloping legs 39). Consequently, the occupant remains in place, and less motion occurs toward other structures in the vehicle including door 40 and console 41. Furthermore, a protective barrier is provided around the occupant.

Figure 7:
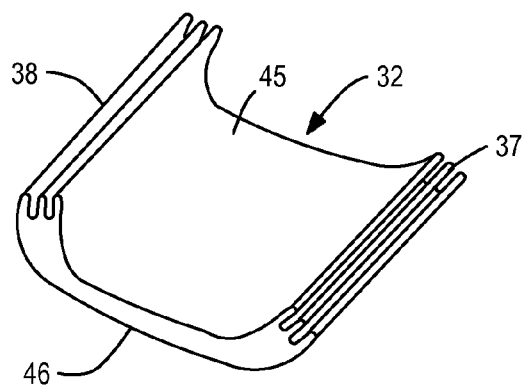
FIG. 7 is a perspective, top view of an inflatable bladder of the invention.
Figure 8:
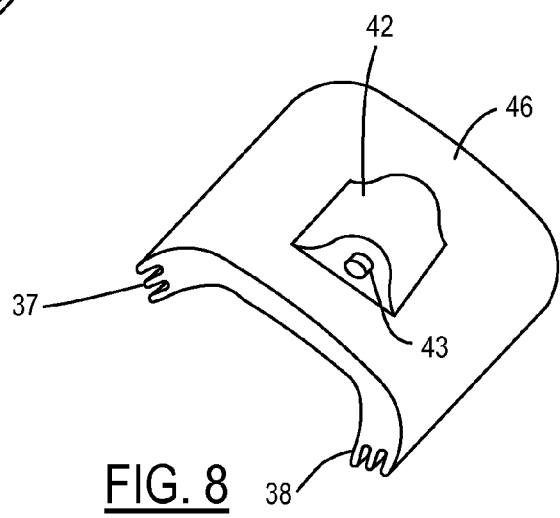
FIG. 8 is a perspective, bottom view of an inflatable bladder of the invention.

Inflatable bladder 32 in its standby state is shown in FIGS. 7 and 8 prior to being overlaid by seat foam or skin. Bladder 32 has an upper side 45 and lower side 46 surrounding the gas chamber and providing a large surface area for accommodating a seated occupant. Pleated sides 37 and 38 are configured to expand as the pleats unfold in response to pressurized inflation gas being discharged from inflator 43. Bladder 32 may be blow-molded or injection molded using various thermoplastics commonly employed for active bolsters such as thermoplastic polyolefins (TPO), polypropylene (PPO), and polyvinylchloride (PVC). Bladder 32 is elastically deformable with a springiness adapted to provide comfortable seating in combination with the outer cushion layer which may employ conventional seat foam. Internal structure such as ribs or webbing may be provided inside inflatable bladder 32 if necessary to provide sufficient support or stiffness in particular load-bearing regions. Although bladder 32 is pressurized or pressurizable under load, it may also be vented as necessary. Dynamic venting structures may provide controlled venting flows at least during a crash event for improving the energy absorbing qualities of the active bolster.

Figure 9:
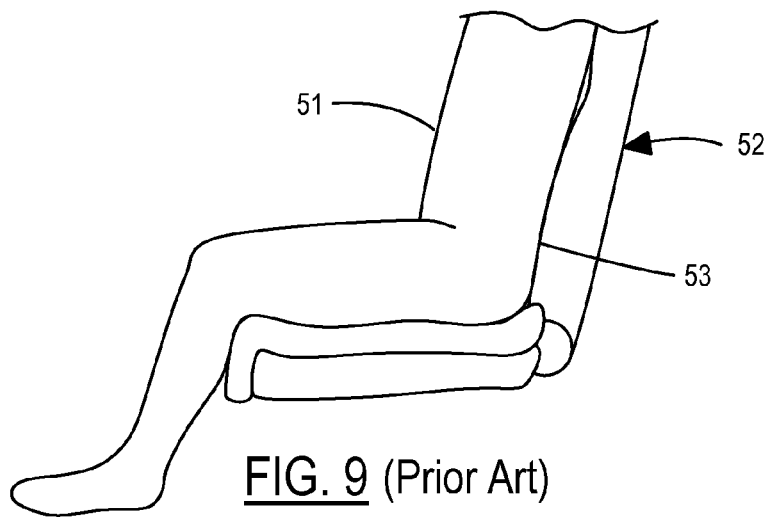
FIG. 9 is a side view of an occupant in a conventional seat prior to a crash event.
Figure 10:
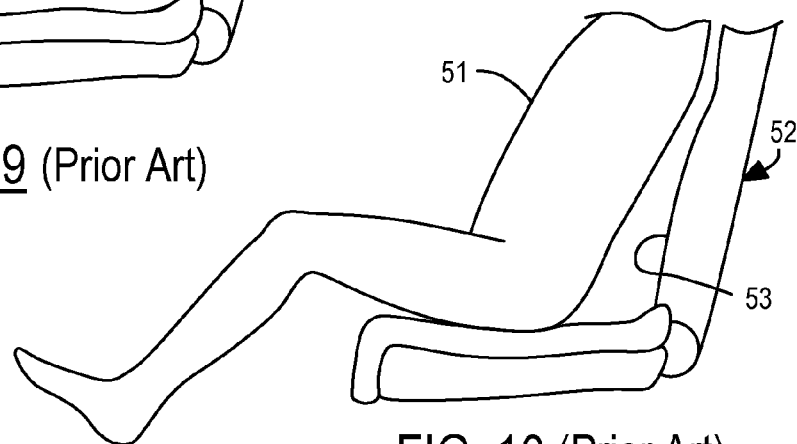
FIG. 10 is a side view of the occupant and seat during submarining of the occupant resulting from a crash event.

FIGS. 9 and 10 illustrate the submarining problem that can be experienced during a front-end collision. In FIG. 9, an occupant 51 is fully seated in a seat 52 and positioned all the way back against a seat back 53. Due to a rearward acceleration of the vehicle during a crash event, occupant 51 slides or submarines forward in seat 52 as shown in FIG. 10, with the lower torso moving away from seat back 53. This movement of occupant 51 is undesirable since an impact against other vehicle structures may result.

Figure 11:
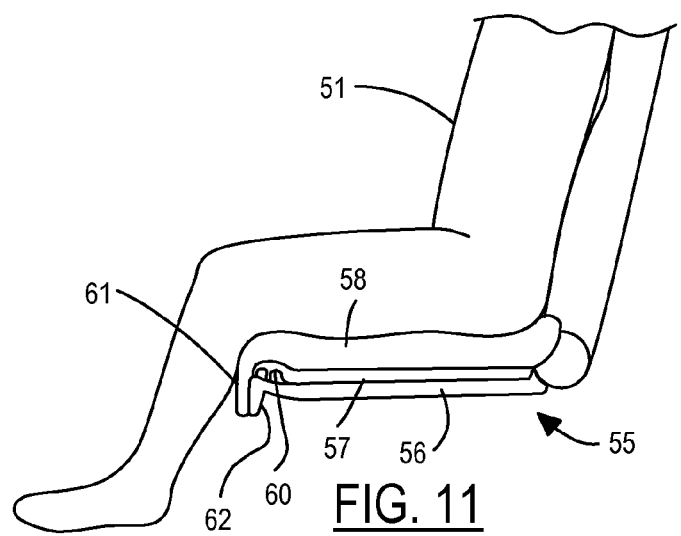
FIG. 11 is a side, partial cross-sectional view of an integrated seat and active bolster prior to a crash event.
Figure 12:
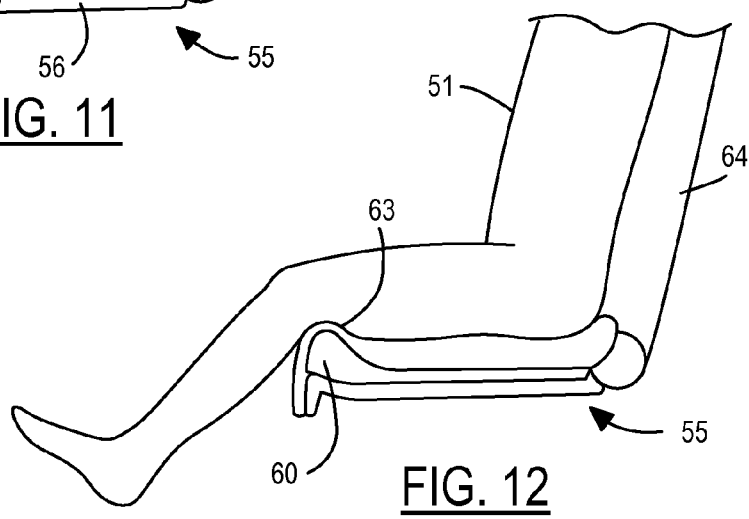
FIG. 12 is a side, partial cross-sectional view of the integrated seat and active bolster of FIG. 11 are inflation resulting from a crash event.

An embodiment of the integrated seat and active restraint of the present invention for addressing the problem of submarining is shown in FIGS. 11 and 12. An improved seat bottom 55 includes a rigid seat frame 56 interfaced with an inflatable bladder 57. Frame 56 may comprise a substantially flat structural panel, a box-like frame, or any other conventional configuration appropriate for providing seat support. Inflatable bladder 57 may be either separate from or integrally molded with frame 56. An outer cushion layer 58 overlies bladder 57, and may be comprised of a foam and skin composite. Bladder 57 has a pleated section 60 running along a forward edge 61 of seat bottom 55. Frame 56 may include a lip 62 along the forward edge which is also covered by foam cushion layer 58. Inflatable bladder 57 is pressurized or pressurizable in order to provide elastic deformation in supporting the load of occupant 51. During a crash event, pleated section 60 is inflated to a deployed state, thereby raising the forward edge along seat bottom 55 as shown at 63. This raised ridge helps to maintain occupant 51 fully against a seat back 64.

Figure 13:
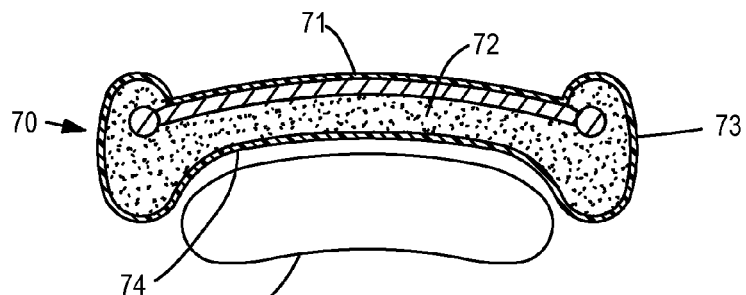
FIG. 13 is a horizontal cross section through a conventional seat prior to a crash event.
Figure 14:
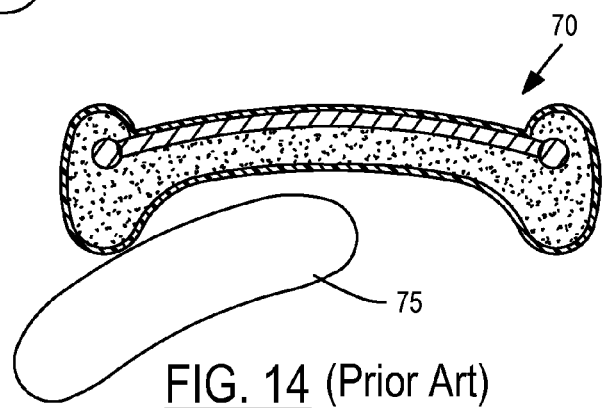
FIG. 14 shows potential movement of an unrestrained occupant during a crash event with a conventional seat.
Figure 15:
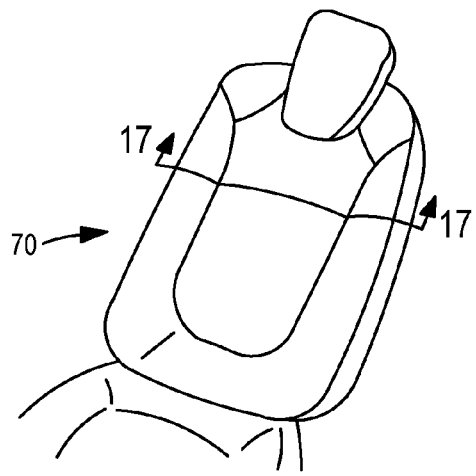
FIGS. 15 and 16 are perspective views of another embodiment of an integrated seat and active bolster in a standby state and a deployed state, respectively.
Figure 16:
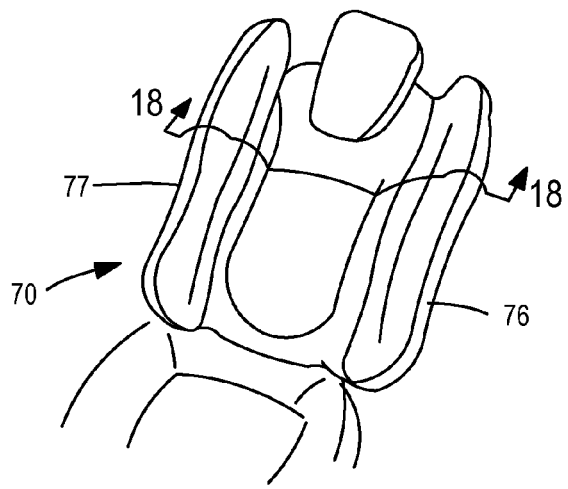

Since the occupant's upper body can also potentially move with respect to the seat back during a crash event, the present invention may also be employed in the seat back. FIG. 13 shows a conventional seat back 70 having a frame 71 supporting a foam cushion 72 wrapped by a skin 73. An occupant 75 bears against a seating surface 74. Even though surface 74 may be contoured with extensions at the lateral sides to provide a recessed area for containing passenger 75, during a crash event (FIG. 14) passenger 75 may easily be accelerated out of seat back 70. To provide better retention of passenger 75 and to provide a protective barrier enveloping a portion of passenger 75, side bolsters 76 and 77 may be deployed from seatback 70 during a crash event as shown in FIGS. 15 and 16. This embodiment is shown in greater detail in cross-sectional views with an inner bladder 80 in a standby state in FIG. 17 and in a deployed state in FIG. 18. Bladder 80 interfaces with a seat frame 81 which may preferably comprise a generally planar back panel. Frame 81 may be a separate component such as a metal back plate or may be comprised of blow molded or injection molded plastic either integrated with or separate from bladder 80. An outer cushion layer is formed over bladder 80 and may also extend fully over frame 81. The outer cushion layer preferably comprises a seat foam body 82 which is covered by an outer skin layer 83 that may be a colored elastomeric material. Skin 83 of the outer cushion layer provides an outer contour 84 along a seat support surface against which occupant 75 rests.

Figure 17:
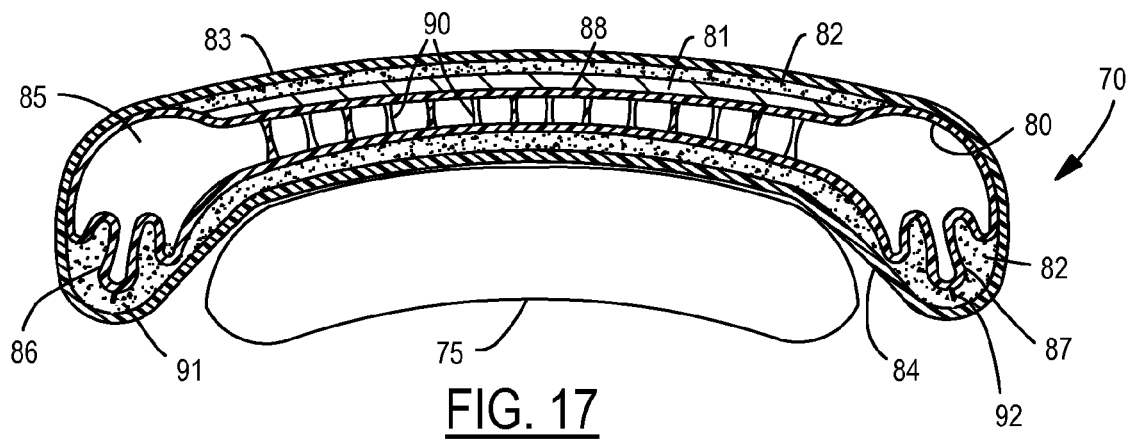
FIG. 17 is a cross section of the integrated seat and active bolster taken along line 17-17 of FIG. 15.
Figure 18:
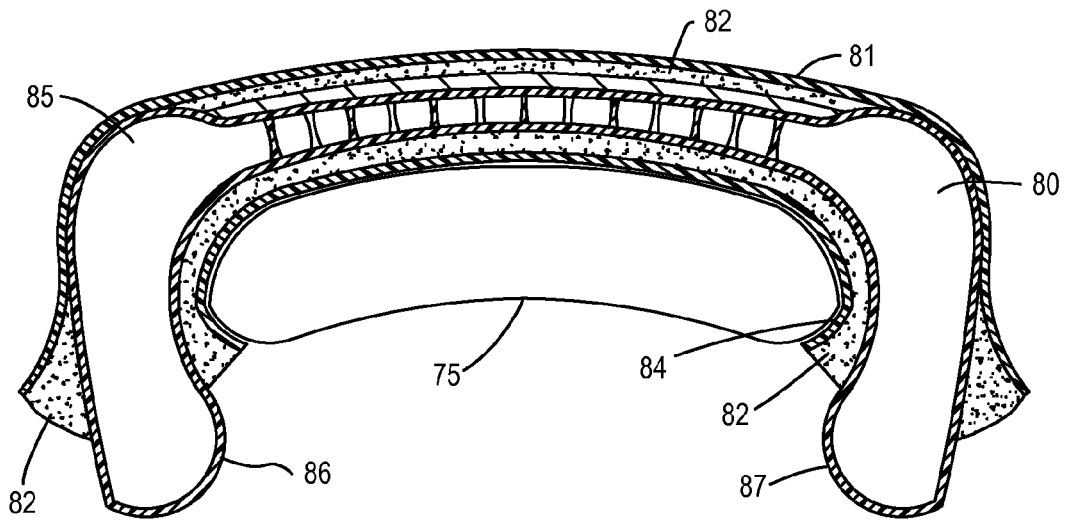
FIG. 18 is a cross section of the integrated seat and active bolster taken along line 18-18 of FIG. 16.

Inflatable bladder 80 defines a gas chamber 85 shown in its standby state in FIG. 17 and in its deployed state in FIG. 18. Pleated sections 86 and 87 are provided at opposite lateral sides of bladder 80 that unfold when bladder 80 extends from the standby state to the deployed state in response to an inflation gas discharged by an inflator (not shown) during a crash event. Bladder 80 also includes a non-expanding section 88 at the central region of bladder 80 which acts as a cushion in conjunction with foam 82. An internal webbing 90 may connect the inner and outer walls of bladder 80 in the non-expanding section to prevent or controllably limit any expansion occurring in the central area of seatback 70. Individual ribs within internal webbing 90 may be staggered or may include openings or other features in order to prevent obstruction of inflation gas flow from the inflator into pleated sections 86 and 87. The location and thickness of individual ribs of internal webbing 90 may be selected to tailor the elastic deformation of bladder 80 according to the needs for proper cushioning as a seat back in the standby state.

To facilitate rupturing of pleated sections 86 and 87 through foam body 82 and skin 83 into the deployed state shown in FIG. 18, foam body 82 may include hidden tear seams 91 and 92 comprising lineal cuts extending at least partially into foam body 82 along its internal vertical edge adjacent to pleated sections 86 and 87. Tear seams 91 and 92 do not penetrate skin 83 in order to remain hidden from view outside of seat back 70. In the deployed state shown in FIG. 18, pleated sections 86 and 87 extend seat support surface 84 to envelop or increase coverage of occupant 75 to maintain a fixed position and to provide a barrier from impacting objects such as a vehicle door or console.

Figure 19:
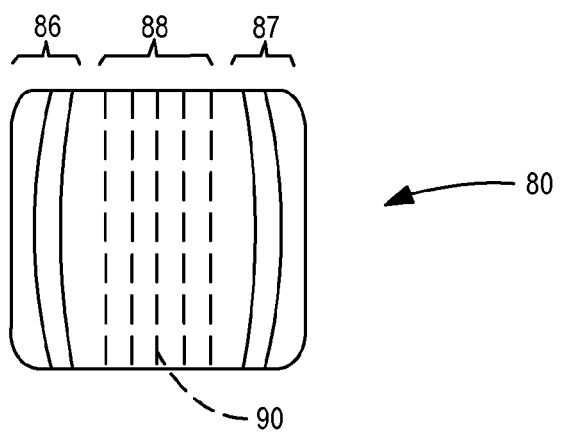
FIG. 19 is a front plan view of one preferred embodiment of an inflatable bladder as shown in FIGS. 17 and 18.

FIG. 19 is a front, plan view of bladder 80 showing pleated sections 86 and 87 at opposite lateral sides and central non-expanding section 88 with internal webbing 90. Bladder 80 is disposed against (i.e., interfaces with) rigid seat frame 81 which acts as a reaction surface, thereby causing forward extension of pleated sections 86 and 87. In the deployed state, the seat support surface extends at opposite lateral sides to envelop the lateral sides of the occupant. Prior to deployment, both the pleated sections and the non-expanding section provide an elastic deformation needed for cushioning of the seated occupant. Besides enhancing crash protection of the occupant, the invention produces passenger seats that take up less packaging space and that can be manufactured at lower cost.

What is claimed is:

1. An integrated seat and active bolster for an automotive vehicle to protect an occupant of the seat during a crash event, comprising:
   a substantially rigid seat frame;
   an inflatable bladder interfacing with the seat frame comprised of a gas chamber, the inflatable bladder having a standby state and a deployed state;
   an outer cushion layer overlying the inflatable bladder and providing an outer contour along a seat support surface; and
   an inflator responsive to the occurrence of the crash event to discharge an inflation gas into the gas chamber to expand the inflatable bladder from the standby state to the deployed state;
   wherein the gas chamber is disposed between the seat frame and the outer cushion layer, and wherein the gas chamber is configured to be load-bearing when in the standby state so that the inflatable bladder elastically deforms to support a load applied against the outer cushion layer; and
   wherein the seat frame provides a reaction surface when the inflatable bladder expands from the standby state to the deployed state, and wherein the deployed state extends the seat support surface to increase coverage of the occupant.

2. The integrated seat and active bolster of claim 1 wherein the inflatable bladder is comprised of molded thermoplastic.

3. The integrated seat and active bolster of claim 1 wherein the inflatable bladder is comprised of a blow-molded polymer.

4. The integrated seat and active bolster of claim 1 wherein the inflatable bladder and the seat frame are integrally molded comprising a thermoplastic.

5. The integrated seat and active bolster of claim 1 wherein the outer cushion layer is comprised of a foam.

6. The integrated seat and active bolster of claim 1 wherein the outer cushion layer is comprised of a multilayer composite including an inner foam and an outer skin.

7. The integrated seat and active bolster of claim 1 wherein the outer cushion layer has a hidden tear seam which separates in response to pressure from the inflatable bladder so that the tear seam ruptures and the inflatable bladder emerges when being expanded to the deployed state.

8. The integrated seat and active bolster of claim 1 wherein the inflatable bladder includes a non-expanding section comprising an internal webbing.

9. The integrated seat and active bolster of claim 1 wherein the inflatable bladder includes a pleated section comprising a plurality of pleats that unfold during expansion to the deployed state.

10. The integrated seat and active bolster of claim 1 wherein the inflatable bladder includes a non-expanding section comprising an internal webbing, and wherein the inflatable bladder includes a pleated section comprising a plurality of pleats that unfold during expansion to the deployed state.

11. The integrated seat and active bolster of claim 1 wherein the seat frame comprises bottom side rails, wherein the inflatable bladder and the outer cushion layer provide a generally horizontal seat support surface, and wherein the seat support surface extends at opposite lateral sides to envelop lateral sides of the occupant.

12. The integrated seat and active bolster of claim 11 wherein the outer cushion layer includes a hidden tear seam along the opposite lateral sides for rupturing in response to expansion of the inflatable bladder.

13. The integrated seat and active bolster of claim 1 wherein the inflatable bladder and the outer cushion layer provide a generally horizontal seat support surface, and wherein the seat support surface extends at a forward-facing edge to reduce submarining of the occupant.

14. The integrated seat and active bolster of claim 1 wherein the seat frame comprises a back panel, wherein the inflatable bladder and the outer cushion layer provide a generally vertical seat support surface, and wherein the seat support surface extends at opposite lateral sides to envelop lateral sides of the occupant.

15. The integrated seat and active bolster of claim 14 wherein the outer cushion layer includes a hidden tear seam along the opposite lateral sides for rupturing in response to expansion of the inflatable bladder.

16. An active bolster method in a vehicle, comprising the steps of:

forming a seat having an inner inflatable bladder covered by an outer cushion layer to provide a support surface;

bearing seating loads on the support surface from the weight of an occupant by elastic deformation of the bladder;

detecting a vehicle crash event; and inflating the bladder to extend a seat surface to protect the occupant during the crash event.

17. The method of claim 16 wherein the support surface is a seat bottom, and wherein the bladder extends at lateral sides of the occupant to provide side crash protection.

18. The method of claim 16 wherein the support surface is a seat bottom, and wherein the bladder extends at a forward side of the occupant to provide anti-submarining protection.

19. The method of claim 16 wherein the support surface is a seat back, and wherein the bladder extends at the lateral sides of the occupant to provide side crash protection.

20. The method of claim 16 wherein the outer cushion layer is formed with a hidden tear seam, and wherein the hidden tear seam ruptures so that the bladder extends through the outer cushion layer to provide the extended seat surface during the crash event.

21. The method of claim 16 wherein the seat is formed with a substantially rigid frame for providing a reaction surface during inflation of the bladder.

\* \* \* \* \*